United States Patent [19]

Perkinson, III

[11] Patent Number: 5,185,508
[45] Date of Patent: Feb. 9, 1993

[54] WELDER LOCATOR ALIGNMENT FIXTURE

[75] Inventor: William O. Perkinson, III, Newport News, Va.

[73] Assignee: Siemens Automotive L.P., Auburn Hills, Mich.

[21] Appl. No.: 844,348

[22] Filed: Mar. 2, 1992

[51] Int. Cl.⁵ .................. B23K 11/00; B23K 37/053
[52] U.S. Cl. ........................... 219/86.24; 29/890.129; 228/44.3
[58] Field of Search ............ 219/86.24, 86.23, 86.245, 219/86.7, 91.2, 117.1, 67, 78.01; 29/888.4–888.46, 890.125, 890.129, 890.131; 228/44.3, 49.1, 56.5

[56] References Cited

U.S. PATENT DOCUMENTS 2,406,963  9/1946  Norton .............................. 29/888.46

FOREIGN PATENT DOCUMENTS 54-151728  11/1979  Japan .................................. 29/888.4
62-142086  6/1987  Japan .................................. 219/86.24

Primary Examiner—Geoffrey S. Evans
Attorney, Agent, or Firm—George L. Boller; Russel C. Wells

[57] ABSTRACT

A machine that resistance welds a valve seat member (14) to a guide member (12) while they are accurately aligned by a locator pin (56). Adjusting mechanism (60) permits limited gimbaling of the locator pin so that replacement and realignment of a new locator pin is easily accomplished.

9 Claims, 3 Drawing Sheets

WELDER LOCATOR ALIGNMENT FIXTURE

FIELD OF THE INVENTION

This invention relates to a machine that is used to align and then join two parts of a fuel injector valve, namely a seat member and a guide member, with accuracy, efficiency, and reliability. More particularly, the invention relates to an improvement for expeditiously setting the perpendicularity of a locator pin that is used to align the seat member and the guide member.

BACKGROUND AND SUMMARY OF THE INVENTION

Certain fuel injectors, such as those illustrated in commonly assigned U.S. Pat. Nos. 4,854,024; 4,967,959; 5,081,766; and 5,016,819, contain a seat member and a guide member that are joined together and assembled into the nozzle end of the fuel injector. A needle having a spherically shaped tip passes through a central circular hole in the guide member to dispose the needle's spherically shaped tip for coaction with a frustoconical shaped seat in the seat member. The needle is biased to seat its tip on the seat, closing the injector to flow. When the fuel injector is operated open, the needle is displaced away from the seat. The central circular hole in the guide member has a very close fit to the needle for guiding the reciprocal motion of the needle toward and away from the seat as the fuel injector is operated closed and open. If the guide member is not accurately aligned with the seat member, the guide member will not accurately guide the needle to and from the seat, possibly causing the injector to exhibit performance that is non-compliant with relevant specifications.

A prior practice for securing proper alignment of the guide member to the seat member comprised the use of a welding machine wherein accuracy of the alignment of the two parts was attained through close dimensional control of a locator pin on a fixture used to align the two parts preparatory to their being welded together and to support them while they were being welded together. Extremely close dimensional tolerances were imposed on the locator pin and related portions of the fixture. Mass production usage of the machine created wear on portions of the fixture, with consequent loss of accuracy in locating the two parts being welded together, so that replacement of parts of the fixture such as the locator pin inevitably became necessary. Significant time was required to make the necessary replacements for restoring the fixture to original condition, and substantial costs incurred on account of the time spent to fabricate the precision replacement parts and to precisely install them in the fixture.

The present invention comprises an improvement for aligning the locator pin to perpendicularity to a plane so that an installed locator pin that is not worn can be expeditiously re-aligned when needed, and so that a new or a replacement locator pin can also be expeditiously aligned when it is being installed. The invention is advantageous in that it is not especially complicated from the standpoint of the amount and nature of parts which it incorporates, and the actual alignment procedure can be accomplished with relatively simple adjustments.

The foregoing features, advantages, and benefits of the invention, along with additional ones, will be seen in the ensuing description and claims, which should be considered in conjunction with the accompanying drawings. The drawings illustrate a presently preferred embodiment of the invention according to the best mode contemplated at the present time for carrying out the invention.

DESCRIPTION OF THE PREFERRED EMBODIMENT

Figure 1:
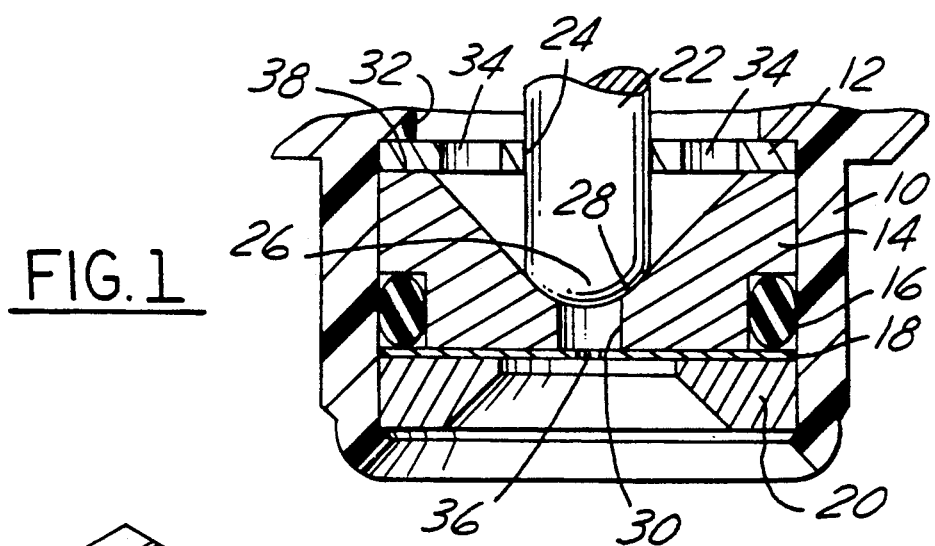
FIG. 1 is a longitudinal cross section through a portion of the nozzle end of a fuel injector valve to illustrate a member and a seat member.

FIG. 1 shows the nozzle end 10 of a representative fuel injector like those in the aforementioned commonly assigned U.S. Patents. It comprises a guide member 12, a seat member 14, an O-ring seal 16, a thin disk orifice member 18, and an annular retainer member 20. A circular cylindrical needle 22 passes through a central circular through-hole 24 in guide member 12 and presents a spherically shaped tip 26 to a frustoconical shaped seat 28 of seat member 14. FIG. 1 shows tip 26 seated on seat 28 to close a hole 30 extending from the bottom of the seat to the opposite face of the guide member. When the fuel injector is operated open, needle 22 is unseated (i.e. moved away from the seat) to open hole 30. This allows fuel to pass from a central fuel passageway 32 of the fuel injector, through a series of holes 34 in guide member 12, through hole 30, through an orifice 36 in member 18, and through member 20 to be injected from the fuel injector. Guide member 12 and seat member 14 are joined together, such as by welding, at mutually abutting surfaces, reference numeral 38. It is important that the two members be accurately aligned so that hole 24 and seat 28 are precisely coaxial with needle 22 and its spherical tip 26.

Figure 2:
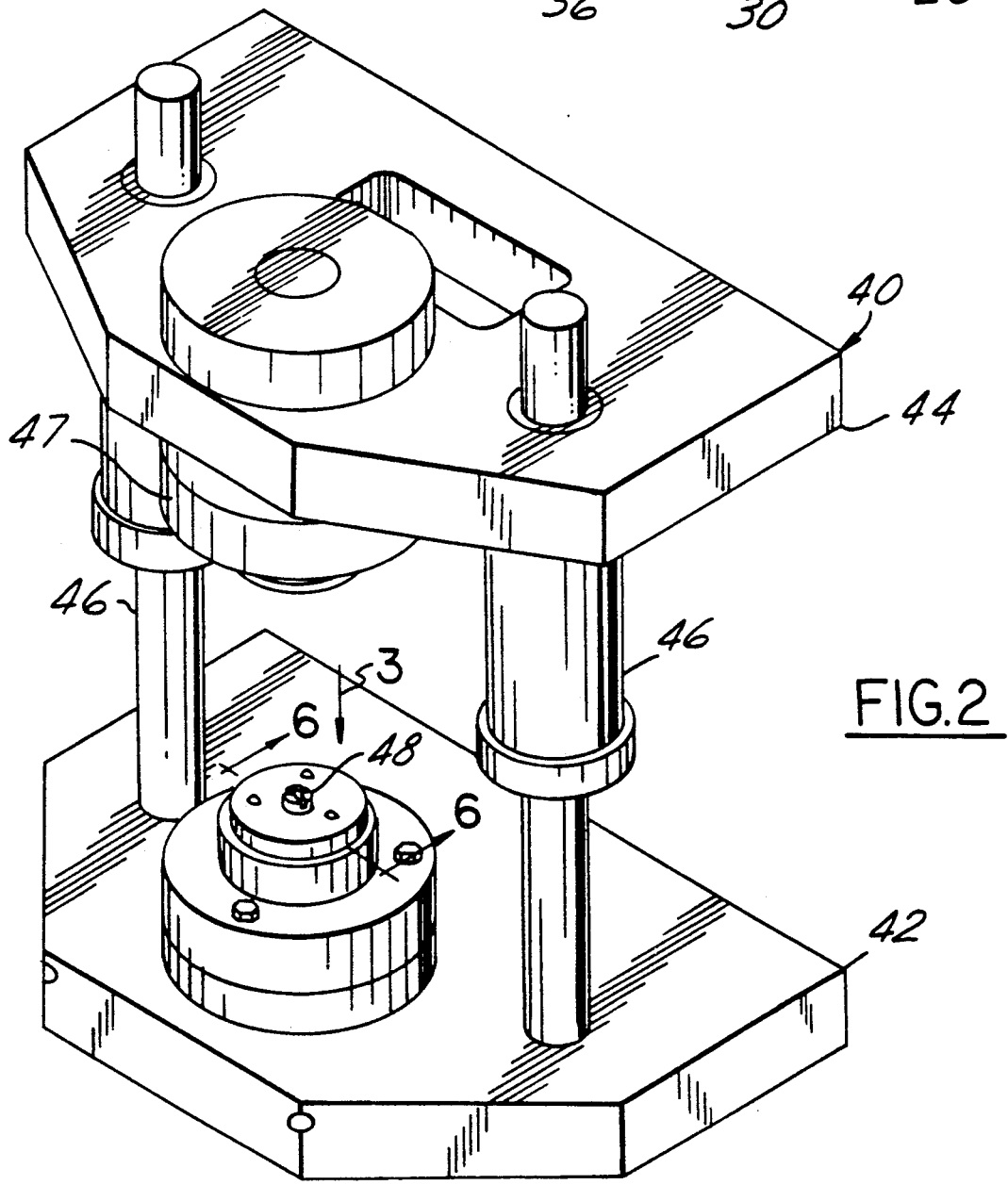
FIG. 2 is a perspective view of a machine according to the present invention for aligning and joining the guide member and the seat member of the fuel injector valve.
Figure 3:
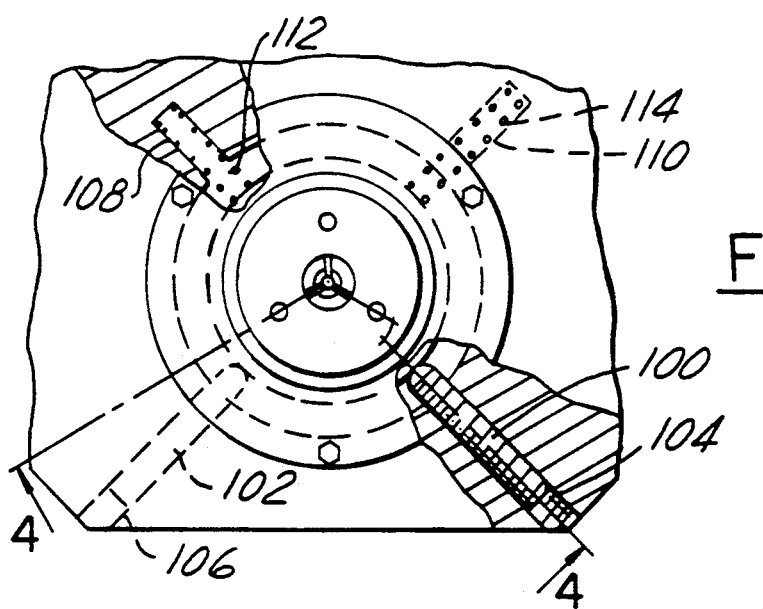
FIG. 3 is a fragmentary view, having portions broken away, in the direction of arrow 3 in FIG. 2.
Figure 4:
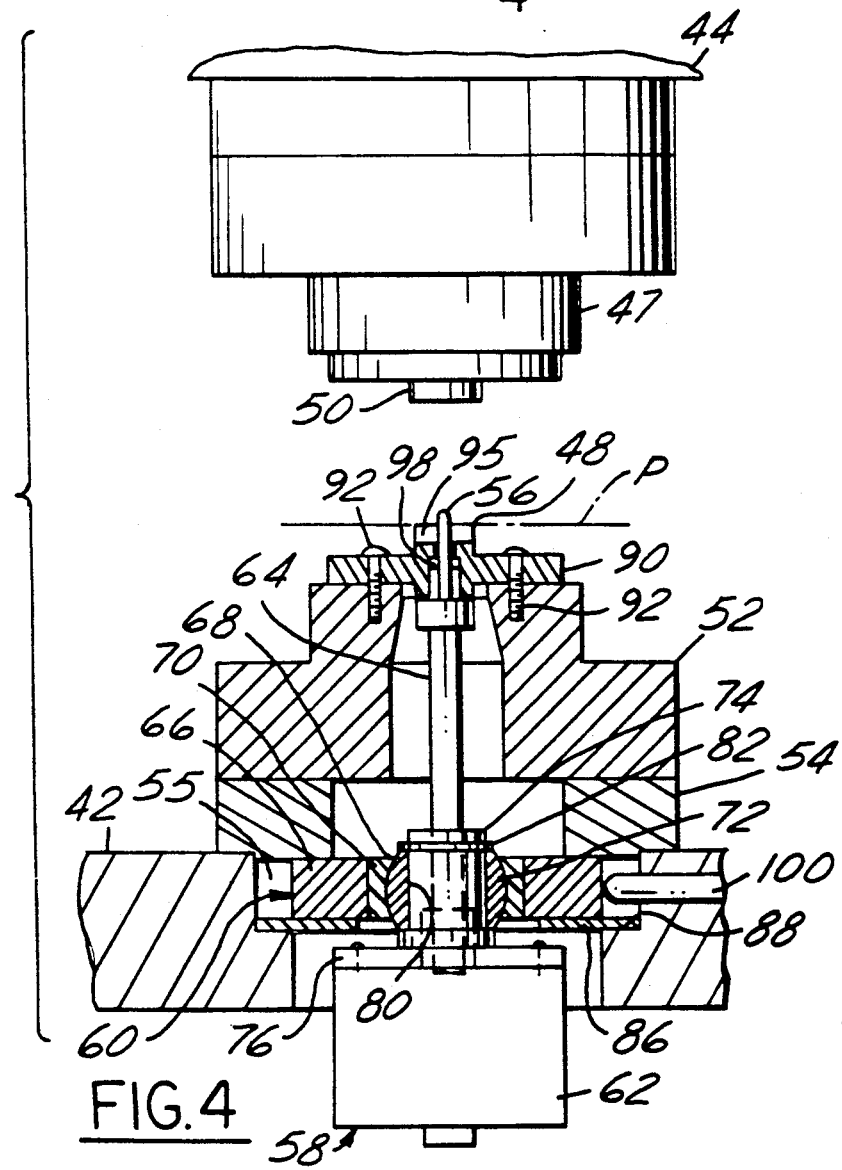
FIG. 4 is a cross section in the direction of arrows 4—4 in FIG. 3 and showing additional portions of the machine.

FIGS. 2, 3, and 4 show a machine 40 according to the present invention for accurately aligning members 16 and 12 and then welding them together. Machine 40 comprises a base plate, or platen, 42 and a top plate 44 that is supported above platen 42 by uprights 46. A fluid cylinder 47 is disposed on top plate 44. FIGS. 2 and 4 show machine 40 in open position wherein a gap exists between respective welding electrodes 48 and 50. Electrode 48 is disposed on platen 42 while electrode 50 is disposed on the movement of cylinder 47.

Electrode 48 is part of a fixture on platen 42. This fixture comprises an electrode support 52, a spacer 54, and a locator pin 56. Platen 42, support 52, and spacer 54 are constructed to cooperatively form an internal cavity 55 which contains a positioning mechanism 58 for positioning locator pin 56 between extended and retracted positions. There is also an adjusting mechanism 60 for securing perpendicularity of locator pin 56 relative to an imaginary plane P passing through the tip face of electrode 48.

Positioning mechanism 58 comprises a fluid cylinder 62 and a pin holder 64. One end of pin holder 64 is attached to the movement of cylinder 62 while locator pin 56 is disposed on the opposite end. The positioning mechanism is disposed on platen 42 by means of an annular adjustment plate 66 into the center of which is press-fit a spherical bearing assembly 68. Bearing assembly 68 comprises an outer part 70 and an inner part 72. Inner part 72 can swivel within outer part 70 about the center of a sphere which lies on the axis of pin holder 64 and the movement of cylinder 62.

Figure 5:
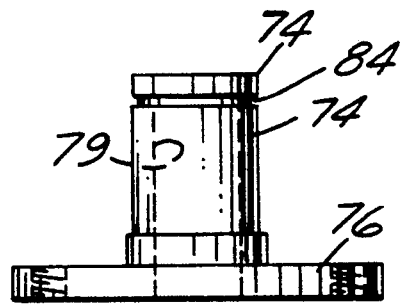
FIG. 5 is an elevational view of one of the parts of FIG. 4 shown by itself on an enlarged scale.

An adapter 74, shown by itself in FIG. 5, serves to mount the body of cylinder 62 to inner part 72. Adapter 74 comprises a flange 76 that is fastened to the end of the body of cylinder 62; it also comprise a tubular collar 78 that extends upwardly from flange 76. A cylindrical clearance hole 79 extends through the two so as to provide for the passage of pin holder 64 through adapter 74. Collar 78 is pressed into a circular through-hole 80 in inner part 72. A snap ring 82 is seated in a groove 84 around the outside of collar 78 just above the upper edge of inner part 72 to provide an interference preventing adapter 74 from being removed from through-hole 80 unless the snap ring is first removed. In effect then, adapter 74 axially captures itself on inner part 72, as shown in FIG. 4.

Adjustment plate 66 is itself axially captured on platen 42 between spacer 54 on the top and a support ring 86 on the bottom. The outer margin of support ring 86 rests on a circular shoulder 88 of platen 42 within cavity 55.

Figure 6:
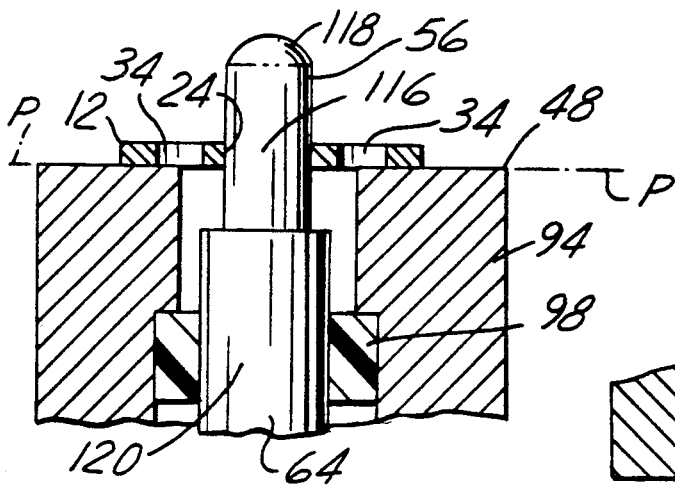
FIG. 6 is an enlarged fragmentary cross section in the direction of arrows 6—6 in FIG. 2, and illustrating a step in the process of using the machine to align and join the guide member and the seat member.
Figure 7:
FIG. 7 is a view like FIG. 6, but illustrating a further step.
Figure 8:
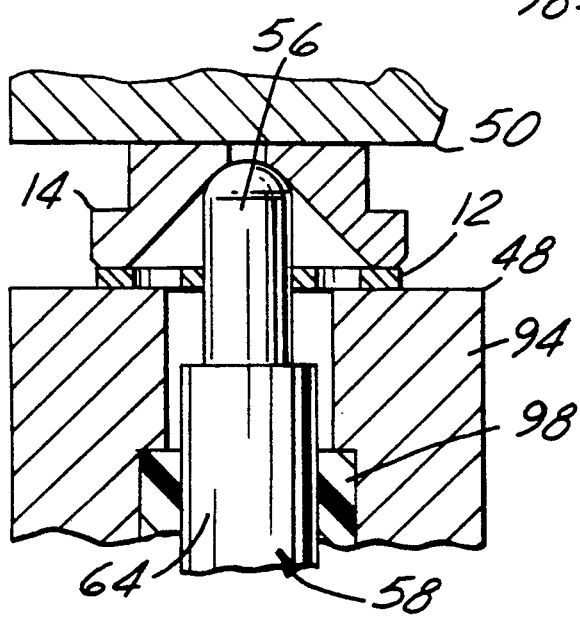
FIG. 8 is a view like FIG. 7, but illustrating a still further step.

While certain features of electrode 48 are presented in FIGS. 2, 3, and 4, more details can be seen in FIGS. 6, 7, and 8. Electrode 48 comprises a circular flange 90 that is fastened against the top face of support 52 by means of fasteners 92. The electrode further comprises a tubular body 94 having a circular cylindrical, internally shouldered, through-hole 96. Body 94 also has three slots that divide its tip face into three identical arcuate zones for welding purposes. The upper portion of pin holder 64 passes through through-hole 96. Pressed into the lower portion of through-hole 96 is a bushing 98. Pin holder 58 has what may be called a finger-fit in bushing 98. This is a frictional fit that is sufficiently non-tight that pin holder 58 can move axially within the bushing with the application of a relatively small force, yet sufficiently tight that the pin holder cannot move radially.

Bushing 98 is a synthetic UHMW material which has a certain limited resilient give that provides for pin holder 58 to gimbal on it about two intersecting axes that are perpendicular to the bushing axis and that intersect the bushing axis at a common intersection point. In other words, the bushing allows the pin holder to describe frustoconical directrices lying within a small angular range about the common intersection of the aforementioned three axes. The importance of this capability will be appreciated shortly.

If pin 56 is perfectly perpendicular to plane P, it will assure perfect alignment of members 12 and 14 prior to welding. However, while such perfection may be approachable in actual practice, its attainment is problematic, and this is where the invention comes into play.

Adjustment plate 66 is positionable horizontally within cavity 55, both right and left looking at FIG. 4, as well as into and out of the plane of the paper. This capability, in conjunction with the gimbaled mounting of pin holder 58 in bushing 98, provides for pin 56 to be brought into essentially perfect perpendicularity to plane P. The means for performing such horizontal positioning of adjustment plate 66 comprises two screws 100, 102 that are disposed in respective threaded holes 104, 106 that extend horizontally in platen 42 from an outer vertical surface to cavity 55. The screws are disposed such that their inner tip ends abut the outside diameter surface of adjustment plate 66. In platen 42 diametrically opposite each hole 104, 106 about cavity 55 is a blind hole 108, 110 respectively. A respective helical spring 112, 114 is disposed compressed to a certain degree in the respective hole 108, 110 by the abutment of the outer end of the spring with adjustment plate 66. The two springs are disposed ninety degrees apart about the cavity to act radially of adjustment plate 66 and so are the screws 100, 102. The net effect is that the adjustment plate is substantially centered within the cavity, but is adjustable within a limited range of this centering. Because cylinder 62 is in effect swivelly mounted on the adjustment plate by virtue of the spherical bearing, and because of the aforementioned give in bushing 98 that allows pin holder 64 to gimbal, or tilt, positioning of the adjustment plate by positioning screws 100, 102 within holes 104, 106 does not impart any significant bending moment to pin holder 64, and therefore the pin holder remains straight, while it is brought to essentially perfect perpendicularity by adjusting screws 100, 102. The adjustment screws are tool-accessible via the open outer ends of holes 104, 106. Thus, if locator pin 56 does not have perfect perpendicularity to plane P upon being assembled, or if it should lose such perfect perpendicularity for any reason, adjustment mechanism 60 makes it possible to position the locator pin to perfect perpendicularity. Conventional gauging procedures can be employed to ascertain when the desired perpendicularity has been attained.

FIGS. 6, 7, and 8 illustrate certain steps in the process of aligning and welding members 12 and 14. Locator pin 56 has a circular cylindrical gauge surface 116 for gauging member 12 via hole 24 when the member is placed on the tip of electrode 48 as in FIG. 6. FIG. 7 shows member 14 to have been disposed between member 12 and electrode 50, and cylinder 47 having been operated to move electrode 50 to the position shown. Locator pin 56 has a spherically shaped tip 118 corresponding to that of needle 22. It can be seen in FIG. 7 that member 14 has interacted with tip 118 to cause seat 28 to align with the coaxis of pin 56 and its tip 11, closing hole 30. If there had been any misalignment between members 12 and 14 prior to their assuming the aligned condition illustrated by FIG. 7, member 14 would move relative to pin 56 to eliminate the misalignment. Continued extension of cylinder 47 from the FIG. 7 position will cause members 12 and 14 to abut as shown in FIG. 8, locator pin 56 retracting in the process while its tip remains seated on seat 28. In the FIG. 8 position, a clamping force is being exerted on members 12 and 14 via electrodes 48 and 50. Electric welding current is then caused to flow between the electrodes, and will flow through the abutting surfaces of members 12 and 14 causing them to become welded together. After the welding has been completed, the current is terminated, and cylinder 47 is retracted. Cylinder 62 is also retracted at this time below the level of plane P to withdraw locator pin 56 from hole 24. Withdrawal of the locator pin in this way facilitates removal of the joined members 12 and 14 from machine 40. After the joined members have been removed, cylinder 62 is again extended to receive the next member 12. Thus, the reader should appreciate that the positions of locator pin 56 that are illustrated in the several FIGS. represent cylinder 62, and hence the locator pin, in extended position. It should also be appreciated that details of the welding circuit and its connections to the electrodes are conventional, and are not specifically illustrated. Suitable insulation is used avoid electrification of other than the electrodes by the welding circuit.

Figure 9:
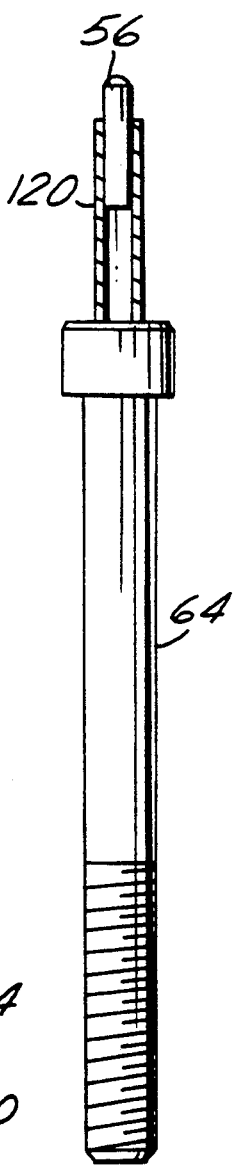
FIG. 9 is an enlarged elevational view of another of the parts by itself and partly in section.

FIG. 9 shows details of a preferred construction for locator pin 56 and pin holder 64. The upper end of the pin holder has a circular cylindrical sleeve 120 that forms a socket into which the locator pin is press fit. This allows for only the locator pin to be replaced when the need arises. It is the exterior of sleeve 120 that passes through bushing 98.

While a presently preferred embodiment of the invention has been illustrated and described, it should be appreciated that principles may be practiced in other than the specific embodiment that has been herein disclosed.

What is claimed as the invention is:

1. A machine for aligning a valve seat member to a valve guide member, and for uniting the two members after they have been aligned, said valve seat member comprising a frustoconical seating surface adapted for coaction with a spherically contoured tip end of a circular cylindrical valve member in a valve into which the valve seat member and the valve guide member are assembled after they have been united, said valve guide member comprising a circular cylindrical guide hole through which such a circular cylindrical valve member passes in such a valve for the purpose of guiding axial reciprocation of such a valve member toward and away from said seat member, said machine comprising a platen having a fixture thereon, said fixture comprising means defining a planar surface for providing underlying support of said guide member and locator pin means comprising a cylindrical locator pin having a spherically contoured tip and a circular cylindrical gauging surface proximal to its spherically contoured tip and locator pin holder means disposing said locator pin to pass coaxially through such a guide member such that the circular cylindrical guide hole of such a guide member is gauged by said circular cylindrical gauging surface of said locator pin when said guide member is supported on said planar surface, said machine further comprising force-applying means for forcing such a seat member against such a guide member in a direction toward said planar surface and causing the frustoconical seating surface of such a valve seat member to coact with said locator pin's spherically contoured tip so as to effect coaxial alignment of such a seat member with said locator pin and hence also with said guide member, means for conducting a uniting operation to unite such members while they are so aligned by said force-applying means and said locator pin, and an adjustment mechanism for setting the perpendicularity of said locator pin to said planar surface.

2. A machine as claimed in claim in which said adjustment mechanism comprises a spherical mounting joint that has a spherical center that is spaced proximally of said circular cylindrical gauging surface and is substantially coaxial with said locator pin, a UHMW bushing through which said locator pin means passes and which is disposed on said fixture to embrace said locator pin means distally of said joint and proximally of said gauging surface, while allowing limited gimbaling of said locator pin means about intersecting axes that pass perpendicularly through said bushing member, and positioning means for radially and angularly setting the position of said spherical center with respect to said bushing.

3. A machine as claimed in claim 2 in which said means for conducting a uniting operation comprises welding means, said welding means comprises an electrode that forms said means defining a planar surface, and said electrode comprises a through-hole within which said bushing is disposed and through which said locator pin means passes.

4. A machine as claimed in claim 2 in which said positioning means comprises two adjustment screws received in respective non-parallel threaded holes in said platen and acting against an adjustment member containing said spherical mounting joint, and spring means acting on said adjustment member to urge it against said screws.

5. A machine as claimed in claim 1 in which said locator pin means is operable to positions of extension and retraction along the direction of its axis by means of a fluid cylinder having a movement to which said locator pin holder means is attached.

6. A machine as claimed in claim 1 in which said means for conducting a uniting operation comprises welding means.

7. A machine as claimed in claim 6 in which said welding means comprises an electrode that is disposed on said force-applying means and that engages such a seat member.

8. A machine for aligning and then uniting two members comprising a platen having a fixture thereon, said fixture comprising means defining a planar surface for providing underlying support of one of such two members and locator pin means comprising a locator pin having a tip and a cylindrical gauging surface proximal to its tip and locator pin holder means disposing said locator pin to pass coaxially through such one of such two members such that a hole of such one of such two members is gauged by said cylindrical gauging surface of said locator pin when such one of such two members is supported on said planar surface, said machine further comprising force-applying means for forcing a surface of such other member against a surface of such one member in a direction toward said planar surface, means for conducting a uniting operation to unite such members while they are so forced by said force-applying means and said locator pin is so gauging such one member, and an adjustment mechanism for setting the perpendicularity of said locator pin to said planar surface, said adjustment mechanism comprising a spherical mounting joint that has a spherical center that is spaced proximally of said cylindrical gauging surface and is substantially coaxial with said locator pin, a UHMW bushing through which said locator pin means passes and which is disposed on said fixture to embrace said locator pin means distally of said joint and proximally of said gauging surface, while allowing limited gimbaling of said locator pin means about intersecting axes that pass perpendicularly through said bushing member, and positioning means for radially and angularly setting the position of said spherical center with respect to said bushing.

9. A machine as claimed in claim 8 in which said positioning means comprises two adjustment screws received in respective non-parallel threaded holes in said platen and acting against an adjustment member containing said spherical mounting joint, and spring means acting on said adjustment member to urge it against said screws.

* * * * *